(12) United States Patent
Arends et al.

(10) Patent No.: US 6,591,378 B1
(45) Date of Patent: Jul. 8, 2003

(54) DEBUG CONTROLLER IN A DATA PROCESSOR AND METHOD THEREFOR

(75) Inventors: John H. Arends, Austin, TX (US); Jeffrey W. Scott, Austin, TX (US); William C. Moyer, Dripping Springs, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/507,740

(22) Filed: Feb. 22, 2000

(51) Int. Cl.$^7$ ................................................ G06F 11/00
(52) U.S. Cl. ...................... 714/38; 714/30; 712/227; 717/124
(58) Field of Search .............................. 714/38, 30, 34, 714/35, 17; 712/227, 209; 717/124

(56) References Cited

U.S. PATENT DOCUMENTS

| | | | | |
|---|---|---|---|---|
| 4,796,177 A | * | 1/1989 | Nishimura et al. ............ | 711/2 |
| 5,084,814 A | * | 1/1992 | Vaglica et al. ............... | 710/305 |
| 5,226,129 A | * | 7/1993 | Ooi et al. ..................... | 712/204 |
| 5,526,485 A | * | 6/1996 | Brodsky ....................... | 714/38 |
| 5,530,804 A | * | 6/1996 | Edgington et al. ............ | 714/30 |
| 5,533,192 A | * | 7/1996 | Hawley et al. ............... | 714/28 |
| 5,704,034 A | * | 12/1997 | Circello ....................... | 714/38 |
| 5,956,494 A | * | 9/1999 | Girardeau et al. .......... | 712/209 |
| 5,956,495 A | * | 9/1999 | Kahle et al. .................. | 703/26 |
| 5,983,018 A | * | 11/1999 | Kanzaki ..................... | 717/127 |
| 6,145,097 A | * | 11/2000 | Moyer et al. ................. | 714/30 |
| 6,205,560 B1 | * | 3/2001 | Hervin et al. ................. | 714/34 |

* cited by examiner

Primary Examiner—Robert Beausoliel
Assistant Examiner—Yolanda L. Wilson
(74) Attorney, Agent, or Firm—Joanna G. Chiu

(57) ABSTRACT

A method for debug control in a pipelined data processor where an offset is determined for the program counter (PC) based on the state of the pipeline. The offset is subtracted from the PC value at the end of a debug session. The resultant PC value restarts fetching of a last unsuccessfully completed instruction. If the offset indicates a change to the PC value, the instruction register is adjusted to a nop to allow the pipeline to restart execution after the last successfully completed instruction. In one embodiment, the state of the machine is preserved prior to exception handling.

25 Claims, 6 Drawing Sheets

1

DEBUG CONTROLLER IN A DATA PROCESSOR AND METHOD THEREFOR

RELATED APPLICATION

This is related to U.S. patent application Ser. No. 08/924,117 filed Sep. 5, 1997, and entitled "Method and Apparatus for Providing Operand Feed Forward Support in a Data Processing System" and is incorporated herein by reference and assigned to the current assignee hereof.

FIELD OF THE INVENTION

The present invention relates to a data processing system, and specifically to a method and apparatus for debug handling in a data processing system.

RELATED ART

It is important to provide a useful and cost effective approach for allowing emulation and debug of a data processing system, particularly when the data processing system is implemented on an integrated circuit with limited pins or terminals to communicate information. Most emulation and debug approaches provide a mechanism to allow observability and controllability of portions of circuitry within the data processing system. For example, it is desirable to sample registers, memory, and on-chip peripherals at a given instruction boundary. Many processors perform scanning using a dedicated hardware interface.

To enter a debug session, an instruction and/or data may be marked. The debug session is then entered when the operation is terminated. The debug session allows the user to debug the programming code running on the system by evaluating the state of the machine at the point where the instruction and/or data is marked. This includes examining registers, memory, peripherals, etc. Upon completion of the debug session, execution continues after the last successfully completed instruction. It is desirable to sample the processor's resources after the unsuccessful completion of an instruction, but prior to overwriting the values stored in these resources, such as often occurs on exception handling.

In a pipelined processor architecture, operations are divided into stages, where multiple instructions are moving through the pipeline, with one instruction per each stage. For example, a pipeline often includes the stages: fetch, decode, execute, and writeback. The program counter and instruction register stay ahead of the instruction that is currently in the execution stage, creating a problem on return from debug mode.

Where an exception occurs, the exception handling may overwrite the processor status and return address. For an imprecise machine, the exception results in a non-recoverable state of the processor. One prior art processor allows non-maskable breakpoints that allow the processor to stop, but incur a penalty that it may not be restartable.

A need therefore exists for a method of determining a last unsuccessful instruction which is reexecuted after debug. Similarly, a need exists for a method of debug handling that retains sufficient uncorrupted information to allow return to normal processing.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The terms "assert" and "negate" is used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

According to one aspect of the present invention, a method of debugging a pipelined data processing system includes recognizing an exception, entering debug mode prior to processing the exception, reading a state of the pipelined data processing system, performing debug handling, updating the state of the pipelined data processing system, and returning to a normal mode of operation to process the exception.

According to another aspect of the present invention, a method of debugging a pipelined data processing system having a program counter and a control register includes: entering a debug mode; reading a state of the pipelined data processing system; performing debug handling; and updating the state of the pipelined data processing system. Updating the state of the pipelined data processing system comprises adjusting the program counter based on an offset field within the control register.

In still another aspect of the present invention, a pipelined data processing system is capable of entering a debug mode. The system has a plurality of registers, including a program counter, and control circuitry, coupled to the program counter, having a control register, wherein the control register includes an offset field corresponding to the program counter. The system further includes a pipeline control unit coupled to receive a first plurality of bus signals, and an exception control unit coupled to the pipeline control unit and the control register. The exception control unit is coupled to receive a second plurality of bus signals, wherein the pipeline control unit provides a pipeline state to the exception control unit and the exception control unit updates the offset field based at least in part on the pipeline state.

Figure 1:
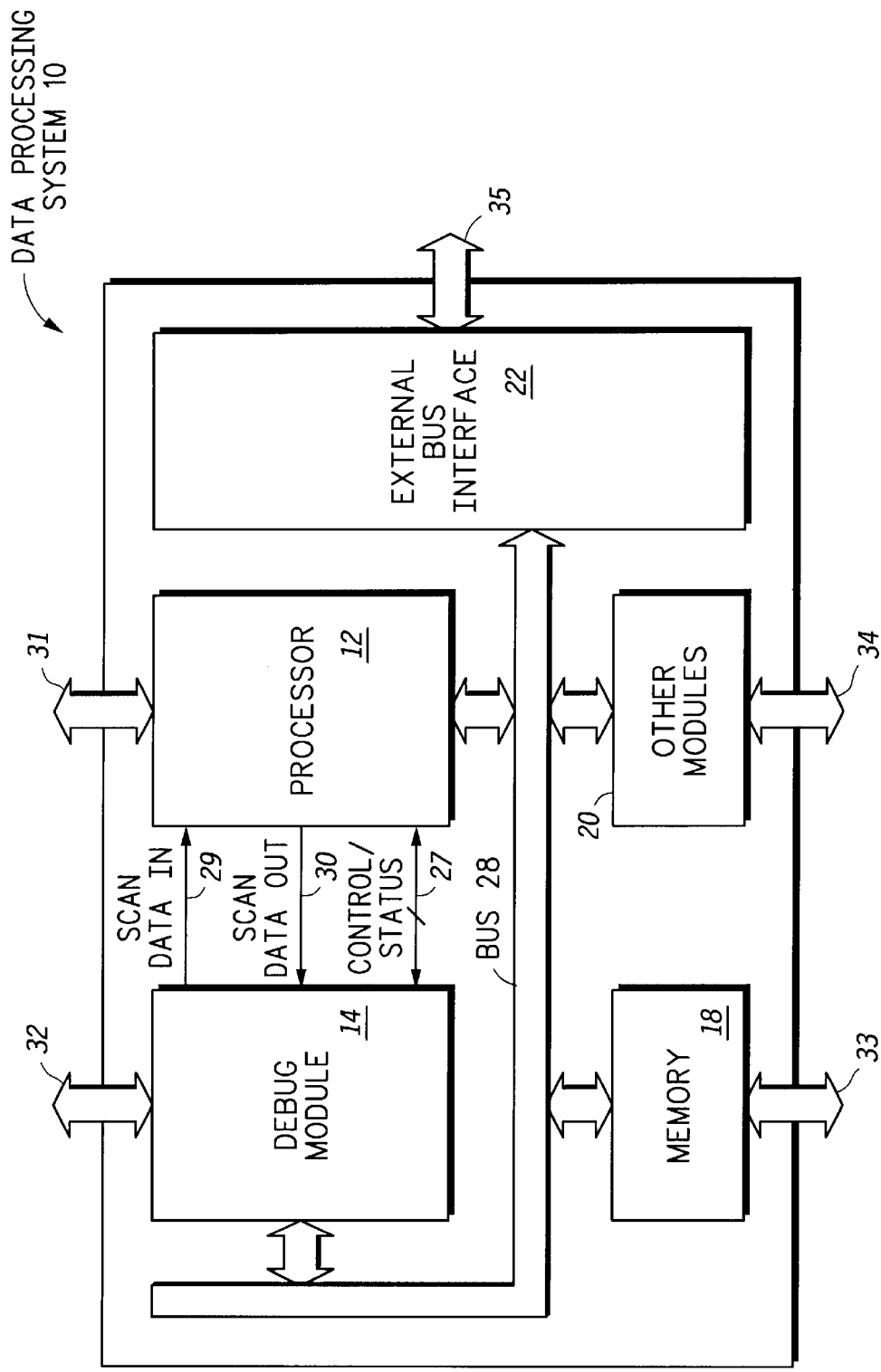
FIG. 1 illustrates a data processing system according to one embodiment of the present invention.

FIG. 1 illustrates one embodiment of a data processing system 10 which includes a processor 12, a debug module 14, a memory 18, other modules 20, and external bus interface 22 which are all bi-directionally coupled by way of bus 28. Alternate embodiments of the present invention may include one or more of memory 18, other modules 20, and external bus interface 22 as part of data processing system 10. Note that other modules 20 may include any type of functional circuitry, such as, for example, a timer, a serial port, additional memory of any type, I/O ports, etc. Also, debug module 14 may use a wide variety of techniques for providing emulation and debug signals external to data processing system 10.

Still referring to FIG. 1, external bus interface 22 is bi-directionally coupled external to data processing system 10 by way of integrated circuit terminals 35. Processor 12 may optionally be coupled external to data processing system 10 by way of integrated circuit terminals 31. Debug module 14 may optionally be coupled external to data processing system 10 by way of integrated circuit terminals 32. Note that debug module 14 may convey emulation and debug information external to data processing system 10 by way of integrated circuit terminals 32 and/or by way of bus 28, external bus interface 22, and integrated circuit terminals 35. Memory 18 may optionally be coupled external to data processing system 10 by way of integrated circuit terminals 33. Other modules 20 may optionally be coupled external to data processing system 10 by way of integrated circuit terminals 34. Processor 12, memory 18, other modules 20, and external bus interface 22 are each bi-directionally coupled to bus 28. Debug module 14 provides a SCAN DATA IN signal 29 to processor 12 and receives a SCAN DATA OUT signal 30 from processor 12. Debug module 14 and processor 12 are also bi-directionally coupled by way of control/status conductors 27.

Figure 2:
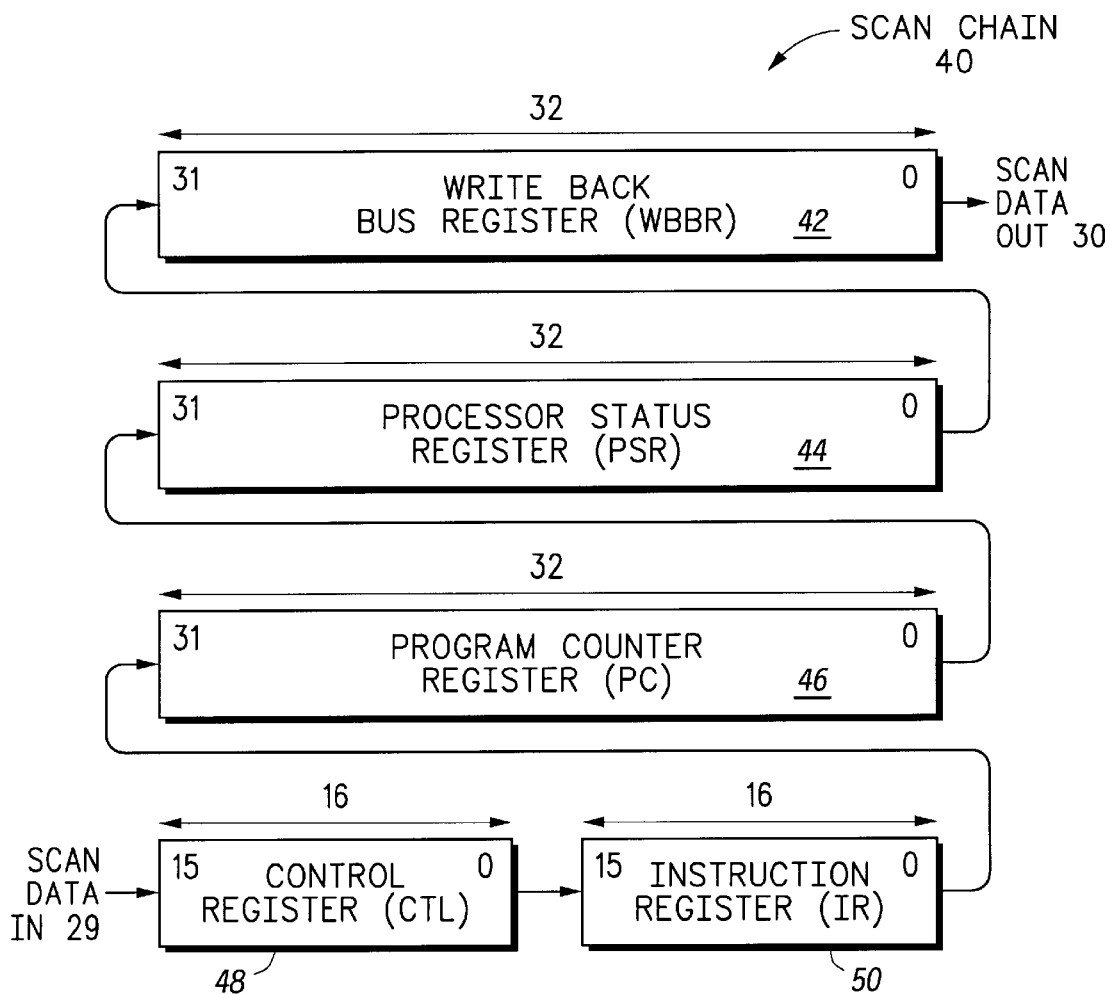
FIG. 2 illustrates a scan chain of registers within a data processing system as in FIG. 1 according to one embodiment of the present invention.

FIG. 2 illustrates one embodiment of an emulation and debug serial scan chain 40 utilized by the present invention. In the embodiment, SCAN DATA IN signal 29 is provided as a serial input to bit 15 of control register 48. Bit 0 of control register 48 is serially coupled to bit 15 of instruction register 50. Bit 0 of instruction register (IR) 50 is serially coupled to bit 31 of program counter register (PC) 46. Bit 0 of program counter register 46 is serially coupled to bit 31 of processor status register (PSR) 44. Bit 0 of processor status register 44 is serially coupled to bit 31 of write back bus register (WBBR) 42. Bit 0 of write back bus register 42 is serially coupled to provide the SCAN DATA OUT signal 30 from processor 12 to debug module 14 (see FIG. 1).

Referring to FIG. 1, in one embodiment of the present invention data processing system 10 has a debug module 14 which is used to control debug and emulation processing. Debug module 14 communicates with processor 12 by way of the SCAN DATA IN signal 29, the SCAN DATA OUT signal 30, and control/status conductor(s) 27. The serial scan chain 40 formed by SCAN DATA IN 29 and SCAN DATA OUT 30 is illustrated in FIG. 2. In one embodiment of the present invention, the registers illustrated in FIG. 2 have been selected to be included in the scan chain. In alternate embodiments of the present invention, different registers, fewer registers, or more registers could be included in this scan chain 40.

Figure 3:
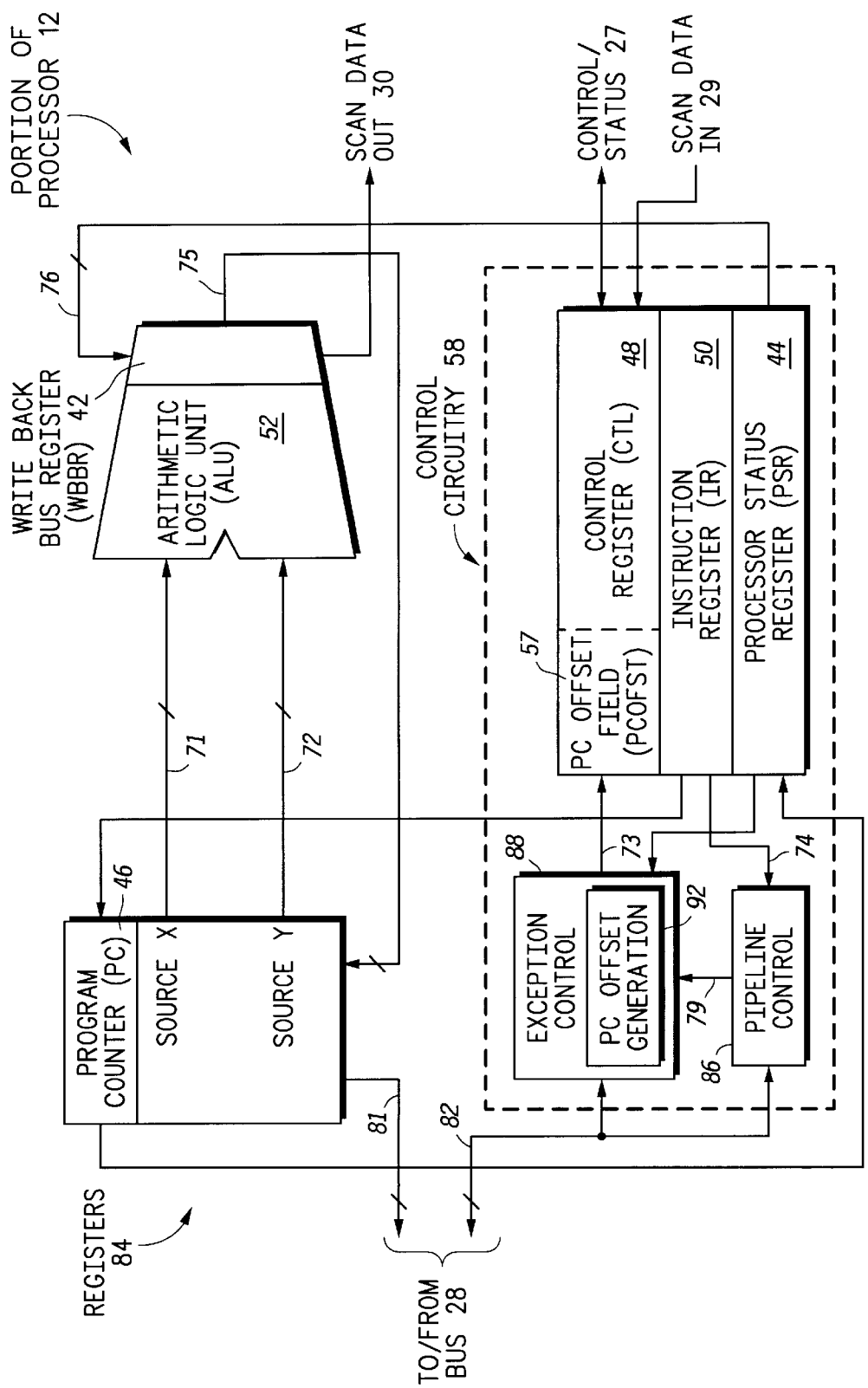
FIG. 3 illustrates a processor within a data processing system as in FIG. 1 according to one embodiment of the present invention.

FIG. 3 illustrates one embodiment of a portion of processor 12 of FIG. 1. In one embodiment, processor 12 includes registers 84 which are coupled to arithmetic logic unit (ALU) 52 by way of conductors 71 and 72 for source X and source Y data, respectively. Registers 84 are coupled to bus 28 via conductor(s) 81 by which they communicate with data processing system 10. Registers 84 include a program counter (PC) register 46, as well as a plurality of other address, data, and control registers. The output of ALU 52 is coupled to write back bus register (WBBR) 42. The WBBR register 42 is coupled to registers 84 by way of conductors 75, which may be considered as the "write back bus" used to write a result value from ALU 52 back to a destination register. SCAN DATA OUT 30 is provided from the WBBR 42. The WBBR 42 receives information via conductor(s) 76 from a processor status register (PSR) 44 included within control circuitry 58.

The scanning illustrated in FIG. 2 is detailed with respect to the circuitry of FIG. 3. Control circuitry 58 also includes control register (CTL) 48 and instruction register (IR) 50. In one embodiment, CTL 48 is a latch for processor 12 state variables prior to entering a debug mode, and is effected by operations performed during a debug session. The CTL 48 is typically restored by an external command controller on return to normal operating mode. In one embodiment, the external command controller is external to data processing system 10 of FIG. 1 and provides commands to the debug module 14. The commands from the external command controller cause debug module 14 to effect the scan chain 40 of FIG. 2. The CTL 48 is bi-directionally coupled to control status conductor(s) 27 and receives SCAN DATA IN 29. The IR 50 is coupled to the PC 46, which is then coupled to the PSR 44. The PSR 44 is then coupled to WBBR 42 via conductor(s) 76.

In one embodiment of the present invention, control register 48 includes a PC offset field (PCOFST) 57 for controlling the debug process used by emulation firmware. The emulation firmware is code stored in the system which allows the user to emulate operation of at least a portion of the system and evaluate how code will run on the system. The emulation firmware modifies the PC value and the IR value prior to exiting debug mode. The PCOFST 57 provides the offset value for correction of the PC during debug mode. According to one embodiment of the present invention, two (2) bits are used to encode the offset, where "00" indicates no correction, "01" indicates a decrement of the PC by two, "10" indicates a decrement of the PC by four and "11" indicates a decrement of the PC by six. Alternate embodiments may use other encodings, and any number of bits. Note that the functionality of one or more of the PCOFST bits 57 may be encoded into one or more bits that also source or serve other functions.

The PCOFST bits 57 are coupled to exception control 88 via conductor(s) 73. Exception control 88 includes a PC offset generation section 92 for determining a value which is used to correct the PC. The exception control 88 receives pipeline information and control signals from pipeline control 86 via conductor(s) 79, where the pipeline control 86 is responsive to IR 50 by way of conductor(s) 74. The pipeline control 86 and the exception control 88 communicate with the data processing system 10 by way of bus 28 to which each is coupled via conductors 82. The transfer acknowledge (TA-B) signal, the transfer error acknowledge (TEA-B) signal, the breakpoint (BKPT-B) signal, and the debug enable (DE-B) information are transferred via conductor(s) 82. The TEA-B signal indicates a transfer error, which may indicate a page fault, a data access error or a problem with the memory and/or memory interface. The BKPT-B indicates the occurrence of a breakpoint and may identify entry into debug mode. The DE-B is used to enable a debug session on occurrence of predetermined events. As illustrated in FIG. 3, PSR 44 is coupled to exception control 88, and IR 50 is coupled to pipeline control 86.

In operation, the pipelined processor 12 may require the PC value to be decremented based on the state of the machine and event(s) occurring with the entry into debug mode. The PCOFST specifically provides the decrement value for the PC value. Where the PCOFST indicates that the PC value needs to be decremented, a "no operation" instruction (nop) is typically loaded into the IR 50 by emulation firmware prior to returning to normal operation, else the value of IR 50 is restored.

Figure 4:
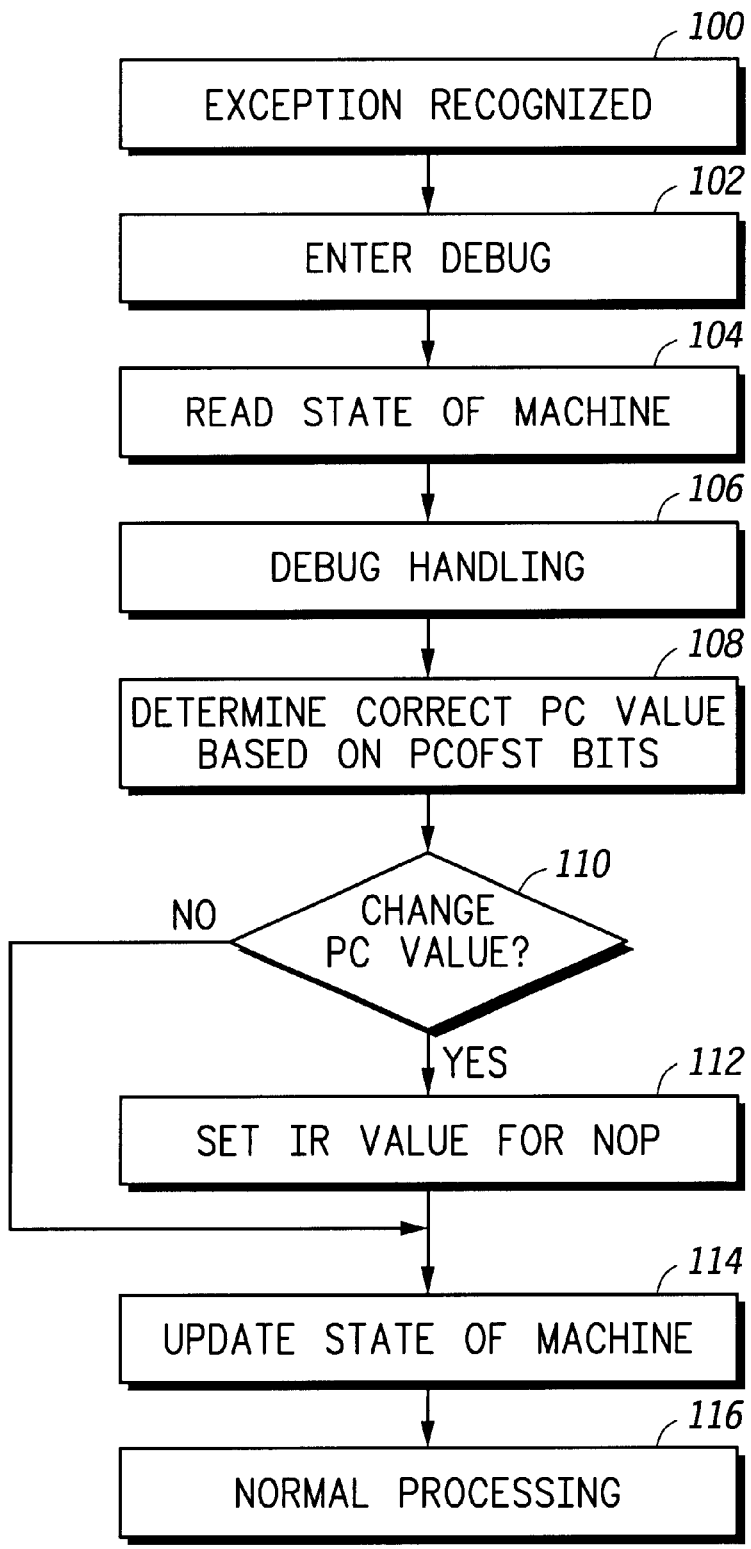
FIGS. 4–5 illustrate a process for debug handling in a data processing system as in FIG. 1 according to one embodiment of the present invention.

One scenario is illustrated with respect to one embodiment of the present invention in FIG. 4, where a debug trigger at block 100 causes the data processing system 10 to enter into debug mode at block 102. Debug triggers include a variety of events and scenarios, including breakpoints marked on data or instructions, hardware debug enable, a software breakpoint instruction, and other system-specific events designed to generate a debug session. On entry into debug mode, the processor 12 pipeline is stalled and the processor 12 clocks are shut off to preserve the state just prior to entry. The state of the machine is read at block 104, which involves reading the status registers of the processor 12. In the present embodiment, a joint test action group (JTAG) type scan is performed according to the order illustrated in FIG. 2. At this point, the PC 46 and PSR 44 are saved for analysis in debug and to provide information for return to normal processing. At this point, the debug module 14 of FIG. 1 facilitates the debug handling.

Upon completion of debug, the state of the machine is prepared for return to normal operating mode. At block 108 the PC 46 value is determined based on the PCOFST bits 57. The PCOFST bits 57 are determined in hardware as a function of the state of the machine, the debug trigger, and any exceptions or other events occurring at approximately the time of the debug trigger. If the PC 46 value is changed in block 108, processing continues from decision diamond 110 to block 112, where a no-operation (nop) instruction is stored in the IR 50. If the PC 46 value was not changed in block 108, then processing continues to block 114. Similarly, processing continues from block 112 to block 114, where the state of the machine is updated. The processor 12 returns to normal processing at block 116.

In one scenario, an exception is recognized prior to entry into debug mode. In this case, prior to handling the exception, the debug mode allows the state of the machine to be read, as at block 104 of FIG. 4, and continues the process as illustrated. After updating the state of the machine at block 114, the return to normal processing 116 involves exception handling. The present method thus allows the state of the machine to be saved prior to exception handling. This is an advantage, as prior art exception handling often alters and corrupts the state of the machine making it unavailable for debug.

Figure 5:
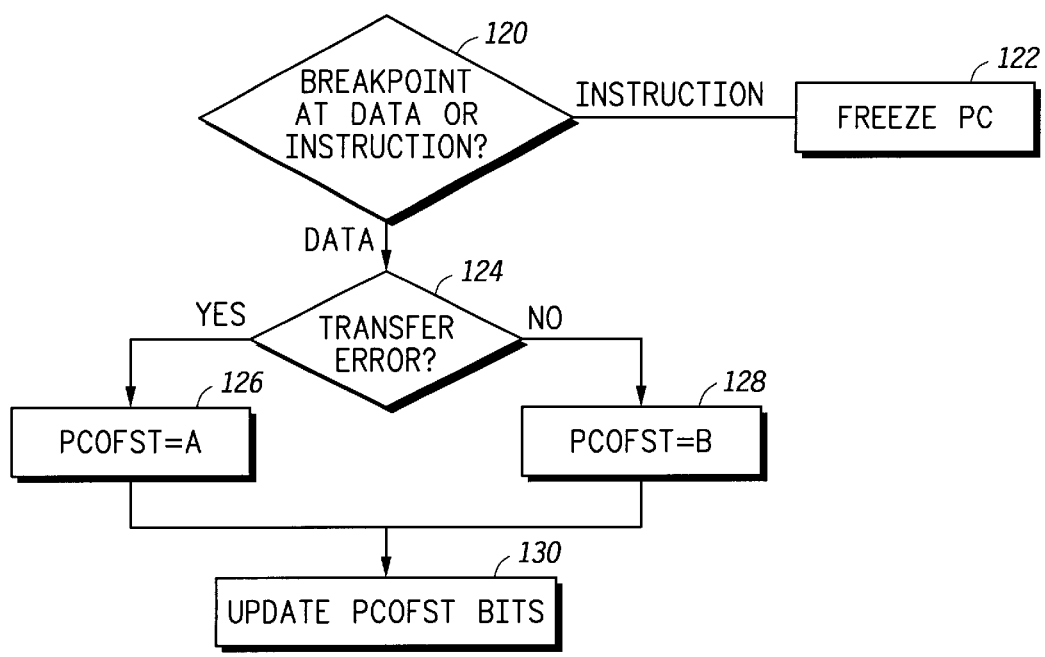

FIG. 5 illustrates the process for determining the PCOFST bits 57. The type of trigger mechanism for entering debug mode is determined at decision diamond 120. When the trigger mechanism is data that is marked for a breakpoint, processing continues to block 124 to determine if a transfer error occurred. A transfer error indicates an error associated with a data access, a page fault, or a problem with the memory and/or memory interface. On a transfer error, the PCOFST value is assigned a first value "A" at block 126. If the transfer completed without error, the PCOFST value is assigned a second value "B" at block 128. A transfer error indicates that the processor must return to refetch a first instruction corresponding to the data on which the transfer error occurred. The value A then provides such an offset to the PC 46. If no transfer error occurs, the processor may be able to continue processing without refetching any instructions in the pipeline, or may need to refetch the instruction after the instruction marked with a breakpoint. The values of A and B are determined by the architecture of the processor 12, the pipeline mechanism, as well as the conditions existing at the time of entry to debug mode. The PCOFST bits 57 are then updated at block 130.

Figure 6:
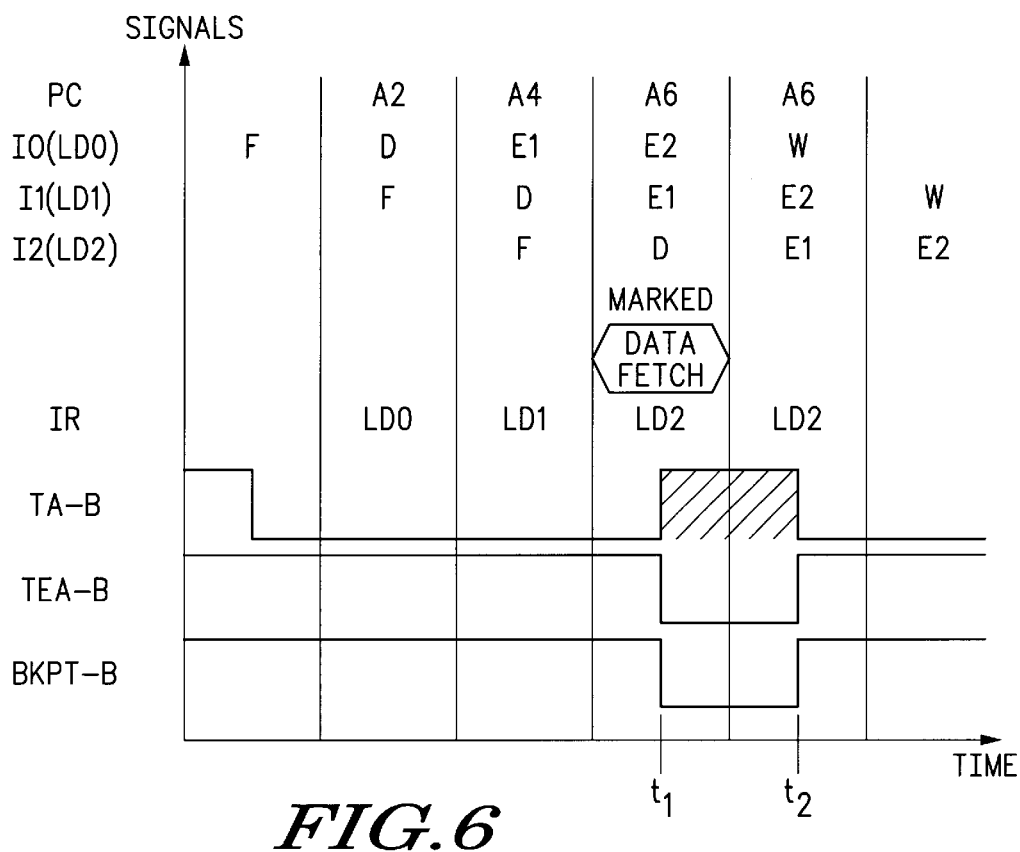
FIGS. 6–7 illustrate timing scenarios for debug handling in a data processing system as in FIG. 1 according to one embodiment of the present invention.

FIG. 6 illustrates a first scenario where successive load instructions are labeled on the vertical axis, I0(LD0), I1(LD1), I2(LD2), and I3(LD3). As illustrated, the pipeline includes Five (5) stages, fetch (F), decode (D), first execute stage (E1), second execute stage (E2), and writeback (W). The time cycles corresponding to processor stages are indicated along the horizontal axis. The PC 46 increments by two at each stage of the pipeline, where each instruction is 16 bits. The address thus increments by four, where two instructions are fetched during each stage. I0 is located at address A0, I1 is located at A2, I2 is located at A4, etc.

From a cleared pipeline, processing begins with a fetch of I0 and I1 during the first stage. In the second stage, the PC 46 increments to A2, the instruction I0 is decoded, and the second instruction pair is fetched. The IR 50 stores the instruction LD0 of I0. In the next stage, the PC 46 increments to A4, the next instruction pair is fetched, and the instructions continue in the pipeline. In the next stage, the PC 46 increments to A6. At this point, data is encountered that is marked for breakpoint and, in response, the BKPT-B signal is asserted at time t1. Note that the signals illustrated are active-low signals. On this breakpoint a transfer error occurred, as indicated by assertion of TEA-B at time t1. In the present example, TEA-B is negated at time t2.

Continuing with FIG. 6, the processor 12 enters debug mode at time t1 and exits debug mode after completion of the debug operation. On entry into debug mode, the PC 46 value remains at A6. Upon entering debug mode, the PC 46 is frozen at A6. In this case, return from debug mode requires adjusting the PC 46 to refetch I0. According to the present embodiment, this involves decrementing the PC 46 by six.

Figure 7:
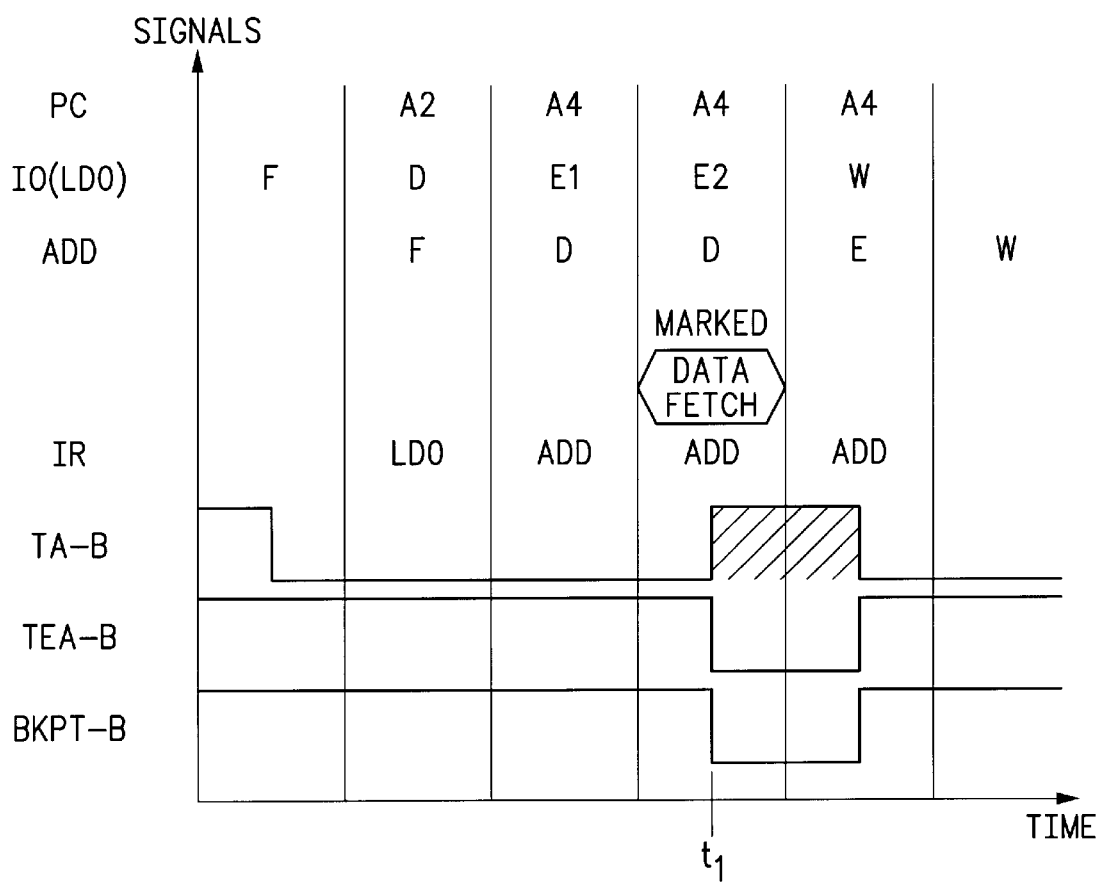

In another scenario, illustrated in FIG. 7, the first instruction, I0, is again a load instruction, while the second instruction, I1, is an ADD instruction. A breakpoint occurs for marked data at time t1 where BKPT-B and TEA-B are asserted. On entering debug mode, the PC 46 value remains at A4. Here a transfer error occurred as indicated by assertion of TEA-B at time t1, and the PC 46 will return to refetch the first instruction, I0, after reset. As the state of the PC 46 going into debug mode is A4, the PC 46 will be decremented by four to return to normal processing.

The present invention provides a method for debug control in a pipelined data processor where an offset is determined for the program counter (PC) based on the state of the pipeline. The offset is subtracted from the PC value at the end of a debug session. Based on the resultant PC value, the instruction register is adjusted to allow refetch of a last unsuccessfully completed instruction. In one embodiment, the state of the machine is preserved prior to exception handling.

A benefit of the present invention is the ability to determine a last unsuccessful instruction to be executed again after completion of debug. This method of debug handling retains sufficient uncorrupted information to allow a return to normal processing.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of debugging a pipelined data processing system, comprising:
    recognizing an exception;
    entering debug mode prior to processing the exception;
    reading a state of the pipelined data processing system;
    performing debug handling;
    updating the state of the pipelined data processing system; and
    processing the exception.

2. The method of claim 1, wherein the exception is one of a software or a hardware exception.

3. The method of claim 1, wherein the debug mode is entered through a breakpoint while debug capabilities are enabled.

4. The method of claim 1, wherein the pipelined data processing system includes a program counter and a control register, the method further comprising:
    adjusting the program counter based on an offset field of the control register, wherein the offset field indicates an offset amount by which to adjust the program counter.

5. The method of claim 4, wherein the debug mode is entered through a breakpoint, further comprising:
    if the breakpoint corresponds to a data access associated with a data transaction instruction, updating the offset field.

6. The method of claim 5, wherein the updating is performed by hardware within the data processing system and is based at least in part on the state of the data processing system.

7. The method of claim 5, wherein:
    if the breakpoint is associated with the data access and if a transfer error occurred, the offset amount adjusts the program counter to correspond with the data transaction instruction associated with the data access; and
    if the breakpoint is associated with the data access and if no transfer error occurred, the offset amount adjusts the program counter to correspond with an instruction following the data transaction instruction associated with the data access.

8. The method of claim 4, wherein the pipelined data processing system further includes an instruction register, the method further comprising:
    updating the instruction register with a nop if the offset amount is not zero.

9. A method of debugging a pipelined data processing system having a program counter and a control register, comprising:
    entering a debug mode;
    reading a state of the pipelined data processing system;
    performing debug handling; and
    updating the state of the pipelined data processing system, comprising:
        adjusting the program counter based on an offset field within the control register.

10. The method of claim 9, wherein the offset field includes a plurality of bits updated by hardware within the data processing system.

11. The method of claim 10, wherein the hardware updates the offset bits based at least in part on the state of the pipelined data processing system.

12. The method of claim 9, wherein the pipelined data processing system includes an instruction register, wherein updating the state further comprises:
    selectively updating the instruction register based on the offset field.

13. The method of claim 12, wherein updating the state comprises scanning data into the data processing system.

14. The method of claim 9, wherein updating the state comprises scanning data into the data processing system.

15. The method of claim 9, wherein:
    adjusting the program counter restores the program counter to correspond to an address of an instruction following a last successfully completed instruction.

16. A pipelined data processing system capable of entering a debug mode, comprising:
    a plurality of registers including a program counter; and
    control circuitry, coupled to the program counter, comprising:
        a control register, wherein the control register includes an offset field corresponding to the program counter; and
        an instruction register, wherein the instruction register is capable of being selectively updated based on the offset field.

17. The pipelined data processing system of claim 16, wherein the control circuitry further comprises a processor status register for storing processor status and control information.

18. The pipelined data processing system of claim 17, wherein a single scan chain comprises the control register, the instruction register, the program counter, and the processor status register.

19. A pipelined data processing system capable of entering a debug mode, comprising:
    a plurality of registers including a program counter; and
    control circuitry, coupled to the program counter, comprising:
        a control register, wherein the control register includes an offset field corresponding to the program counter;
        a pipeline control unit coupled to receive a first plurality of bus signals; and
        an exception control unit coupled to the pipeline control unit, the control register, and coupled to receive a second plurality of bus signals, wherein:
            the pipeline control unit provides a pipeline state to the exception control unit; and
            the exception control unit updates the offset field based at least in part on the pipeline state.

20. The pipelined data processing system of claim 19, wherein the exception control unit updates the offset field based further in part on other exception control signals received by the exception control unit.

21. The pipelined data processing system of claim 19, wherein the control circuitry further comprises a processor status register for storing processor status and control information, and wherein the exception unit updates the offset field based further in part on the processor status register.

22. The pipelined data processing system of claim 19, wherein the first plurality of bus signals includes a data transfer error signal.

23. A pipelined data processing system capable of entering a debug mode, comprising:

a plurality of registers including a program counter; and control circuitry, coupled to the program counter, having a control register, wherein the control register includes an offset field corresponding to the program counter, wherein the offset field comprises a plurality of bits that indicate an offset amount corresponding to the program counter, wherein the offset amount is based at least in part on a state of the data processing system.

24. The pipelined data processing system of claim 23, wherein the offset amount enables selective updating of the program counter upon exiting the debug mode in order to restart instruction execution after a last successfully completed instruction prior to entering the debug mode.

25. The pipelined data processing system of claim 23, wherein the state of the data processing system comprises a pipeline state of the data processing system.

* * * * *